3,157,610
PETROLEUM WAX-ETHYLENE ALKENE
COATING COMPOSITION
Eugene E. Richardson, Highland, Ind., assignor to Standard Oil Company, Chicago, Ill., a corporation of Indiana
No Drawing. Filed Dec. 23, 1960, Ser. No. 77,858
8 Claims. (Cl. 260—28.5)

This invention relates to petroleum wax compositions. More particularly it relates to paraffin wax compositions containing small amounts of a copolymer of ethylene and a terminal monoolefin.

The paperboard milk container industry is a substantial user of paraffin wax for production of moisture impervious containers. As the paperboard milk container industry has expanded, manufacturers of wax have continuously directed their research efforts toward the development of superior and less expensive coating compositions. Insofar as paperboard milk cartons are concerned, the primary problems involved are those of developing a wax coating composition which will prevent the wax from flaking and contaminating the milk and which will prevent the milk from leaking through the paperboard either during the storage of the milk containing carton or during subsequent transportation and handling operations. This means that the coated milk carton must be able to withstand both impact forces and stress concentrations. Since the filled containers must be maintained at rather low temperatures to avoid spoilage of their contents, the problem of developing a suitable wax coating composition is made more difficult than in the case of wax coating compositions which are to be utilized on paper employed at room temperatures, due to the inherent brittleness of waxes or wax compositions at the lower temperatures.

According to the present invention, it has been found that paraffin waxes are improved with respect to their functional properties, so that paper milk containers will withstand substantial impact and flexural forces under low temperature conditions without developing wax flaking, undesirable cracks or fissures in the protective coating, by the incorporation of a small but effective amount of a copolymer of ethylene and a terminal mono-olefin. More specifically, the present invention comprises wax products predominating in paraffin waxes having melting points within the range of from about 120° F. to about 150° F., preferably between 127° F. and 132° F., and a small amount of a linear copolymer of ethylene and propylene or ethylene and butene-1, or mixtures thereof, said amount of copolymer being from about 0.01% to about 5%, and preferably from about 0.1% to about 0.5%.

The terminal monoolefin-ethylene linear copolymer can be produced by a variety of methods as is well known to those skilled in the art. For example, the preferred method of preparing said linear copolymers is described in detail in United States Patent No. 2,691,647 issued to E. Field et al. on October 12, 1954. The copolymers vary in molecular weight but for the purposes of the present invention those copolymers having molecular weights of about 30,000 to about 50,000 have been found most suitable. It has been found that ethylene-propylene copolymers containing five to eight mole percent propylene and that ethylene-butene-1 copolymers containing three to five mole percent butene-1 are most satisfactory for use in the present invention and are therefore the preferred materials.

Preparation of novel compositions, hereinafter described, in accordance with the present invention can be most easily accomplished by melting the paraffin wax and copolymer together with heating to temperatures of 200–260° F., and holding with moderate agitation the mixture at such temperatures for a period of five to sixty minutes.

The following compositions were prepared in the manner set forth above:

Composition A—0.5% of ethylene-propylene copolymer having an average molecular weight of 30,000 and containing 8 mole percent propylene in wax (M.P. 127–132° F.).

Composition B—0.25% of the copolymer of Composition A.

Composition C—0.5% of ethylene-butene-1 copolymer having an average molecular weight of 50,000 and containing 5 mole percent butene-1 in paraffin wax (M.P. 127–132° F.).

Composition D—0.25% of the copolymer of Composition C.

Composition E—0.12% of the copolymer of Composition C.

Incomplete coverage of paper milk cartons is a principal deficiency of paraffin waxes. This lack of coverage occurs at the internal junction of the vertical side walls. Several materials have been suggested as wax modifiers to overcome this serious deficiency of the base wax. However, most modifiers must be used at levels that impart increased viscosity to the wax and therefore create new problems.

Each of the above compositions was tested in a commercial "Pure-Pak" milk carton forming and filling machine. 90–95% of cartons coated with Compositions A and B were completely coated on all inside surfaces. 80–95% of cartons coated with Compositions C and D were completely coated whereas Composition E was borderline ranging from 50 to 90%. The base wax used in preparing the Compositions A–E did not give any cartons with complete internal surface coverage. Wax consumption per 1,000 cartons of the base wax and the aforesaid compositions was substantially the same showing that the presence of the additives of this invention in the wax did not adversely affect the wax viscosity so as to increase the amount of wax adhering to the carton surfaces during coating operations.

Percentages given herein and in the claims are weight percentages unless otherwise stated.

Although the present invention has been described with reference to specific embodiments thereof, the invention is not to be considered as limited thereto but includes within its scope such modification and variations as come within the spirit of the claims.

I claim:

1. A coating composition characterized as being capable of forming a non-brittle coating on paper board food containers, which coating retains flexibility at low temperatures, consisting of (A) a paraffin wax having a melting point of from about 120 to about 150° F. which when applied by itself to such food containers forms a brittle coating thereon, and (B) from about 0.01 to about 5 percent of a copolymer having a molecular weight of from about 30,000 to about 50,000 selected from the group consisting of an ethylene-propylene copolymer containing from about 5 to about 8 mole percent propylene and an ethylene-butene-1 copolymer containing from about 3 to about 5 mole percent of butene-1, said copolymer overcoming the brittle characteristics of said paraffin wax.

2. The composition of claim 1 wherein said copolymer is an ethylene-propylene polymer containing about 5 to about 8 mole percent propylene.

3. The composition of claim 2 wherein said copolymer contains about 8 mole percent propylene.

4. The composition of claim 1 wherein said copolymer is an ethylene-butene-1 copolymer containing about 3 to about 5 mole percent butene-1.

5. The composition of claim 4 wherein said copolymer contains about 5 mole percent butene-1.

6. The composition of claim 1 wherein the amount of copolymer is from about 0.1 to about 0.5 percent.

7. The composition of claim 6 wherein said paraffin wax has a melting point of from about 127 to about 132° F., and said copolymer is an ethylene-propylene copolymer having an average molecular weight of about 30,000 and containing about 8 mole percent propylene.

8. The composition of claim 6 wherein said paraffin wax has a melting point of from about 127 to about 132° F., and said copolymer is an ethylene-butene-1 copolymer having an average molecular weight of about 50,000 containing about 5 mole percent butene-1.

References Cited in the file of this patent
UNITED STATES PATENTS

| | | |
|---|---|---|
| 2,691,647 | Field et al. | Oct. 12, 1954 |
| 2,758,100 | Bailly et al. | Aug. 7, 1956 |
| 2,773,053 | Field et al. | Dec. 4, 1956 |
| 2,877,196 | Reding | Mar. 10, 1959 |

OTHER REFERENCES

Warth: The Chemistry and Technology of Waxes, Reinhold Publishing Corp., New York, chapter 5, 1956.